(12) United States Patent
Rillie et al.

(10) Patent No.: US 8,098,433 B2
(45) Date of Patent: Jan. 17, 2012

(54) DIRECT AND INDIRECT LIGHT DIFFUSING DEVICES AND METHODS

(75) Inventors: David Windsor Rillie, San Marcos, CA (US); Keith Robert Kopitzke, Fallbrook, CA (US); Ding Yao Shay, Vista, CA (US); Paul August Jaster, Carlsbad, CA (US)

(73) Assignee: Solatube International, Inc., Vista, CA (US)

( * ) Notice: Subject to any disclaimer, the term of this patent is extended or adjusted under 35 U.S.C. 154(b) by 0 days.

(21) Appl. No.: 12/636,650

(22) Filed: Dec. 11, 2009

(65) Prior Publication Data

US 2011/0141570 A1 Jun. 16, 2011

(51) Int. Cl.
G02B 17/00 (2006.01)
G02B 27/30 (2006.01)
G02B 5/02 (2006.01)

(52) U.S. Cl. ........ 359/591; 359/593; 359/597; 359/598; 359/599; 52/22; 52/198; 52/200; 52/244; 52/245

(58) Field of Classification Search .......... 359/591–599, 359/641; 52/17, 22, 28–29, 173.3, 199–200, 52/244–245; 126/623; 385/900
See application file for complete search history.

(56) References Cited

U.S. PATENT DOCUMENTS

| | | |
|---|---|---|
| 2,828,734 A | 11/1958 | Boyd |
| 4,018,211 A | 4/1977 | Barr |
| 4,114,186 A | 9/1978 | Dominguez |
| 4,126,379 A | 11/1978 | Wu |
| 4,334,524 A | 6/1982 | McCullough et al. |
| 4,539,625 A | 9/1985 | Bornstein et al. |
| 4,557,565 A | 12/1985 | Ruck et al. |
| 4,615,579 A | 10/1986 | Whitehead |
| 4,733,505 A | 3/1988 | Van Dame |
| 5,099,622 A | 3/1992 | Sutton |
| 5,117,811 A | 6/1992 | Taylor |
| 5,467,564 A | 11/1995 | DeKeyser et al. |

(Continued)

FOREIGN PATENT DOCUMENTS

BE 1 014 530 12/2003

(Continued)

OTHER PUBLICATIONS

"LED Light add on Kit for skylight tubes," Wild Ideas Light Company Ltd., published at least as early as Apr. 2009.
"2301 Optical Lighting Film" Technical Specification, Effective Date: Feb. 1, 2000, 3M Specified Construction Products Department, http://www.mmm.com/office.

(Continued)

Primary Examiner — Clayton E Laballe
Assistant Examiner — Kevin Butler
(74) Attorney, Agent, or Firm — Knobbe, Martens, Olson & Bear, LLP

(57) ABSTRACT

Some embodiments provide a daylighting apparatus comprising an internally reflective tube configured to direct daylight from a first end of the tube to a second end of the tube opposite the first end. A diffuser can be positioned at the second end of the tube. The diffuser can comprise a first optical structure configured such that, when the daylighting apparatus is installed with the first end positioned outside a room and the second end positioned to provide light to the room, a reflected portion of the daylight is directed towards at least one upper region (e.g., a ceiling or upper wall surface) of the room and a transmitted portion of the daylight is directed towards at least one lower region (e.g., a floor surface) of the room.

12 Claims, 10 Drawing Sheets

U.S. PATENT DOCUMENTS

| | | | |
|---|---|---|---|
| 5,493,824 A | 2/1996 | Webster et al. | |
| 5,528,471 A | 6/1996 | Green | |
| 5,546,712 A | 8/1996 | Bixby | |
| 5,648,873 A | 7/1997 | Jaster et al. | |
| 5,655,339 A | 8/1997 | DeBlock et al. | |
| 5,729,387 A | 3/1998 | Takahashi et al. | |
| 5,735,262 A | 4/1998 | Houtman | |
| 5,878,539 A | 3/1999 | Grubb | |
| 5,896,712 A * | 4/1999 | Chao | 52/200 |
| 5,896,713 A | 4/1999 | Chao et al. | |
| 5,897,201 A | 4/1999 | Simon | |
| 5,999,323 A | 12/1999 | Wood | |
| 6,000,170 A | 12/1999 | Davis | |
| RE36,496 E | 1/2000 | Sutton | |
| 6,035,593 A | 3/2000 | Chao et al. | |
| 6,130,781 A | 10/2000 | Gauvin | |
| 6,142,645 A | 11/2000 | Han | |
| 6,219,977 B1 | 4/2001 | Chao et al. | |
| 6,256,947 B1 | 7/2001 | Grubb | |
| 6,321,493 B1 | 11/2001 | Rillie et al. | |
| 6,363,667 B2 | 4/2002 | O'Neill | |
| 6,363,668 B2 | 4/2002 | Rillie et al. | |
| 6,412,238 B2 | 7/2002 | Rillie et al. | |
| 6,415,563 B2 | 7/2002 | Rillie | |
| 6,438,803 B2 | 8/2002 | Rillie et al. | |
| 6,493,145 B1 | 12/2002 | Aoki et al. | |
| 6,502,950 B2 | 1/2003 | Signer | |
| 6,604,329 B2 | 8/2003 | Hoy et al. | |
| 6,623,137 B1 | 9/2003 | Marsonette | |
| 6,655,814 B1 | 12/2003 | Tagawa et al. | |
| 6,699,558 B1 | 3/2004 | Milburn | |
| 6,827,445 B2 | 12/2004 | Abe et al. | |
| 6,840,645 B2 | 1/2005 | Eisenman et al. | |
| 6,870,673 B2 | 3/2005 | Cromer et al. | |
| 7,040,061 B2 | 5/2006 | Rillie et al. | |
| 7,057,821 B2 | 6/2006 | Zincone | |
| 7,082,726 B2 | 8/2006 | Prenn et al. | |
| 7,146,768 B2 | 12/2006 | Rillie | |
| 7,159,364 B2 | 1/2007 | Rillie | |
| 7,168,211 B2 | 1/2007 | Prenn et al. | |
| 7,222,461 B2 | 5/2007 | Piano et al. | |
| 7,296,908 B1 | 11/2007 | Pickard et al. | |
| 7,322,156 B1 | 1/2008 | Rillie et al. | |
| 7,350,327 B1 | 4/2008 | Logan et al. | |
| 7,395,636 B2 | 7/2008 | Blomberg | |
| 7,438,440 B2 | 10/2008 | Dorogi | |
| 7,455,422 B2 | 11/2008 | Gould et al. | |
| 7,481,552 B2 | 1/2009 | Mayfield, III et al. | |
| 7,501,768 B2 | 3/2009 | Lane et al. | |
| 7,510,305 B2 | 3/2009 | Straton et al. | |
| 7,529,594 B2 | 5/2009 | Walters et al. | |
| 7,546,167 B2 | 6/2009 | Walters et al. | |
| 7,546,168 B2 | 6/2009 | Walters et al. | |
| 7,546,709 B2 | 6/2009 | Jaster et al. | |
| 7,576,647 B1 | 8/2009 | Mudge | |
| 7,585,088 B2 | 9/2009 | Tyson | |
| 7,586,408 B1 | 9/2009 | Mudge | |
| 7,603,184 B2 | 10/2009 | Walters et al. | |
| 7,614,767 B2 | 11/2009 | Zulim et al. | |
| 7,621,656 B2 | 11/2009 | Tyson | |
| 7,622,701 B2 | 11/2009 | Stevens et al. | |
| 7,639,423 B2 * | 12/2009 | Kinney et al. | 359/591 |
| 7,642,501 B1 | 1/2010 | Fassbender et al. | |
| 7,690,816 B2 | 4/2010 | Tyson et al. | |
| 7,736,014 B2 | 6/2010 | Blomberg | |
| 7,737,640 B2 | 6/2010 | Marques et al. | |
| 7,757,444 B1 | 7/2010 | Halliday | |
| 7,761,260 B2 | 7/2010 | Walters et al. | |
| 7,771,095 B2 | 8/2010 | Dorogi | |
| 7,784,971 B2 | 8/2010 | Dorogi | |
| 7,806,550 B2 | 10/2010 | Tyson et al. | |
| 7,817,063 B2 | 10/2010 | Hawkins et al. | |
| 7,828,459 B2 | 11/2010 | Rains | |
| 7,839,295 B2 | 11/2010 | Ries, II | |
| 7,845,825 B2 | 12/2010 | Ramer et al. | |
| 7,845,829 B2 | 12/2010 | Shaner | |
| 7,850,342 B2 | 12/2010 | Abdelsamed | |
| 7,863,832 B2 | 1/2011 | Lane et al. | |
| 7,866,855 B2 | 1/2011 | Abdelsamed | |
| 7,883,237 B2 | 2/2011 | Zhang et al. | |
| 7,883,239 B2 | 2/2011 | Rains, Jr. et al. | |
| 7,886,492 B2 | 2/2011 | Kelly et al. | |
| 7,896,521 B2 | 3/2011 | Becker et al. | |
| 7,911,359 B2 | 3/2011 | Walters et al. | |
| 7,918,589 B2 | 4/2011 | Mayfield, III et al. | |
| 7,939,793 B2 | 5/2011 | Rains, Jr. et al. | |
| 7,939,794 B2 | 5/2011 | Rains et al. | |
| 7,950,817 B2 | 5/2011 | Zulim et al. | |
| 2001/0049915 A1 | 12/2001 | Rillie et al. | |
| 2001/0049916 A1 | 12/2001 | Rillie et al. | |
| 2001/0052208 A1 | 12/2001 | Rillie et al. | |
| 2001/0052209 A1 | 12/2001 | Rillie et al. | |
| 2002/0051297 A1 | 5/2002 | Hoy et al. | |
| 2002/0060283 A1 | 5/2002 | Jordan et al. | |
| 2002/0073635 A1 | 6/2002 | Erskine | |
| 2002/0085393 A1 | 7/2002 | Eisenman et al. | |
| 2004/0050380 A1 | 3/2004 | Abe et al. | |
| 2005/0005542 A1 | 1/2005 | Prenn et al. | |
| 2005/0039789 A1 | 2/2005 | Kim | |
| 2005/0128728 A1 | 6/2005 | Eisenman et al. | |
| 2005/0188629 A1 | 9/2005 | Rillie et al. | |
| 2005/0243430 A1 | 11/2005 | Cuttle | |
| 2005/0252111 A1 | 11/2005 | Prenn et al. | |
| 2006/0007549 A1 | 1/2006 | Zincone | |
| 2007/0035841 A1 | 2/2007 | Kinney et al. | |
| 2007/0163732 A1 | 7/2007 | Konstantin et al. | |
| 2007/0271848 A1 | 11/2007 | Wolf et al. | |
| 2008/0130299 A1 | 6/2008 | Dorogi | |
| 2008/0273324 A1 | 11/2008 | Becker et al. | |
| 2009/0091271 A1 | 4/2009 | Zulim et al. | |
| 2009/0141487 A1 | 6/2009 | Gould et al. | |
| 2009/0322250 A1 | 12/2009 | Zulim et al. | |
| 2010/0020548 A1 | 1/2010 | Tyson et al. | |
| 2010/0053971 A1 | 3/2010 | Aggarwal et al. | |
| 2010/0110684 A1 | 5/2010 | Abdelsamed et al. | |
| 2010/0127625 A1 | 5/2010 | Minarczyk et al. | |
| 2010/0149804 A1 | 6/2010 | Abdelsamed et al. | |
| 2010/0232158 A1 | 9/2010 | McCanless | |
| 2010/0246193 A1 | 9/2010 | Clifton et al. | |
| 2010/0274945 A1 | 10/2010 | Westrick, Jr. et al. | |
| 2010/0287081 A1 | 11/2010 | Walters et al. | |
| 2010/0309556 A1 * | 12/2010 | Jaster | 359/593 |
| 2011/0019410 A1 | 1/2011 | Ibanez et al. | |
| 2011/0032709 A1 | 2/2011 | Tyson et al. | |
| 2011/0051413 A1 | 3/2011 | Hand | |
| 2011/0103042 A1 | 5/2011 | Tirrell et al. | |
| 2011/0110086 A1 | 5/2011 | Barnwell et al. | |
| 2011/0127557 A1 | 6/2011 | Ramer et al. | |
| 2011/0134649 A1 | 6/2011 | Becker et al. | |

FOREIGN PATENT DOCUMENTS

| | | |
|---|---|---|
| CA | 2337293 | 8/2002 |
| JP | 60142413 | 9/1985 |
| JP | 60164704 | 11/1985 |
| JP | 60166906 | 11/1995 |
| WO | WO 2006/028703 | 3/2006 |
| WO | WO2010/070169 | 6/2010 |

OTHER PUBLICATIONS

"3M Daylighting Film DF2000MA", Product Bulletin DF2000MA, Release A, Jun. 2006, 3M Graphics Market Center, St. Paul, MN.

Ge et al., "Heat Loss Calculation of Compound Honeycomb Solar Collection"; Journal of Thermal Science, vol. 2, No. 4, pp. 254-259, Oct. 1993.

Kaushika et al., "Solar Transparent Insulation Materials: A Review"; Renewable and Sustainable Energy Reviews, vol. 7, pp. 317-351, 2003.

International Search Report and Written Opinion of the International Searching Authority dated Feb. 7, 2011, PCT Application No. PCT/US2010/059329, filed Dec. 7, 2010.

Sunflower Corporation, "Sustainable Commercial Daylighting Technical Overview", undated, received on Dec. 11, 2009.

* cited by examiner

DIRECT AND INDIRECT LIGHT DIFFUSING DEVICES AND METHODS

BACKGROUND

1. Field

This disclosure relates generally to daylighting systems and methods and more particularly to light diffusing devices and methods.

2. Description of Related Art

Daylighting systems typically include windows, openings, and/or surfaces that provide natural light to the interior of a structure. Examples of daylighting systems include skylight and tubular daylighting device (TDD) installations. In a TDD installation, a transparent cover can be mounted on a roof of a building or in another suitable location. An internally reflective tube can connect the cover to a diffuser mounted in a room or area to be illuminated. The diffuser can be installed in a ceiling of the room or in another suitable location. Natural light entering the cover on the roof can propagate through the tube and reach the diffuser, which disperses the natural light throughout the interior of the structure. Certain currently known devices and methods for diffusing light suffer from various drawbacks.

SUMMARY

Example embodiments described herein have several features, no single one of which is indispensable or solely responsible for their desirable attributes. Without limiting the scope of the claims, some of the advantageous features will now be summarized.

Some embodiments provide a daylighting apparatus comprising an internally reflective tube configured to direct daylight from a first end of the tube to a second end of the tube opposite the first end. A diffuser can be positioned at the second end of the tube. The diffuser can comprise a first optical structure configured such that, when the daylighting apparatus is installed with the first end positioned outside a room and the second end positioned to provide light to the room, a reflected portion of the daylight is directed towards at least one upper region (e.g., a ceiling or upper wall surface) of the room and a transmitted portion of the daylight is directed towards at least one lower region (e.g., a floor surface) of the room.

The first optical structure can comprise a reflective surface shaped and positioned to change the direction of propagation of the reflected portion of the daylight. The reflective surface can comprise at least a first face configured to reflect collimated daylight at a first incident angle. The reflective surface can comprise at least a second face configured to reflect the collimated daylight at a second incident angle different from the first incident angle. The reflective surface can comprise a plurality of additional faces.

The reflective surface can comprise at least a first curved face configured to reflect collimated daylight at a plurality of incident angles. The reflective surface can comprise a lower reflective face region, a middle reflective face region, and an upper reflective face region. Each of the lower reflective face region, the middle reflective face region, and the upper reflective face region can be a conical frustum. The first optical structure can comprise a reflective element with many different shapes, such as the general shape of a frustum of a hyperboloid.

The first optical structure can comprise at least one aperture shaped and positioned to permit at least some of the transmitted portion of the daylight to pass through the first optical structure. The first optical structure can comprise at least one reflective surface interrupted by a plurality of openings configured to permit at least some of the transmitted portion of the daylight to pass through the first optical structure.

The diffuser can comprise a second optical structure configured to receive light exiting the first optical structure. The second optical structure can be configured to spread the reflected portion of the daylight. The second optical structure can also be configured to spread the transmitted portion of the daylight.

Certain embodiments provide a method of providing light inside of a structure. The method can comprise the steps of positioning an internally reflective tube between a first location outside the structure and a second location in a room of the structure in a manner that permits daylight to be directed along the tube from the first location to the second location and positioning a diffuser at an end of the tube in the room such that the diffuser reflects a first substantial portion of the daylight exiting the tube towards at least one upper region (e.g., a ceiling and wall surface) of the room and permits a second substantial portion of the daylight exiting the tube to pass through the diffuser towards at least one lower region (e.g., a floor surface) of the room.

Positioning a diffuser can comprise positioning a first optical element configured to reflect at least some of the daylight and positioning a second optical element around the first optical element. The second optical element can be configured to spread the daylight exiting the tube. Positioning a diffuser at an end of the tube can comprise positioning an optical element such that it extends at least partially into the tube.

Some embodiments provide a method of manufacturing a daylighting device. The method can comprise the steps of disposing a reflective material on each side of a substrate to form at least one sheet having two reflective surfaces; cutting or otherwise forming the sheet to include a plurality of openings in the sheet; shaping the at least one sheet to form an optical element having at least one reflective face region with a generally circular cross-section and an aperture extending through the at least one reflective face region; and placing the optical element at one end of an internally reflective tube. The tube can be configured to receive daylight and to direct the daylight towards the optical element. Shaping the at least one sheet can comprise shaping at least a first sheet and a second sheet and joining the first sheet and the second sheet to form the optical element.

The method can comprise the step of placing a second optical element over the first optical element, the second optical element configured to spread light exiting the tube. The optical element can be configured such that, when the daylighting apparatus is installed with the first end positioned outside a room and the second end positioned to provide light to the room, a reflected portion of the daylight is directed towards at least one ceiling or wall surface of the room and a transmitted portion of the daylight is directed towards at least one floor surface of the room.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers may be reused to indicate correspondence between reference elements.

DETAILED DESCRIPTION OF PREFERRED EMBODIMENTS

Figure 1:
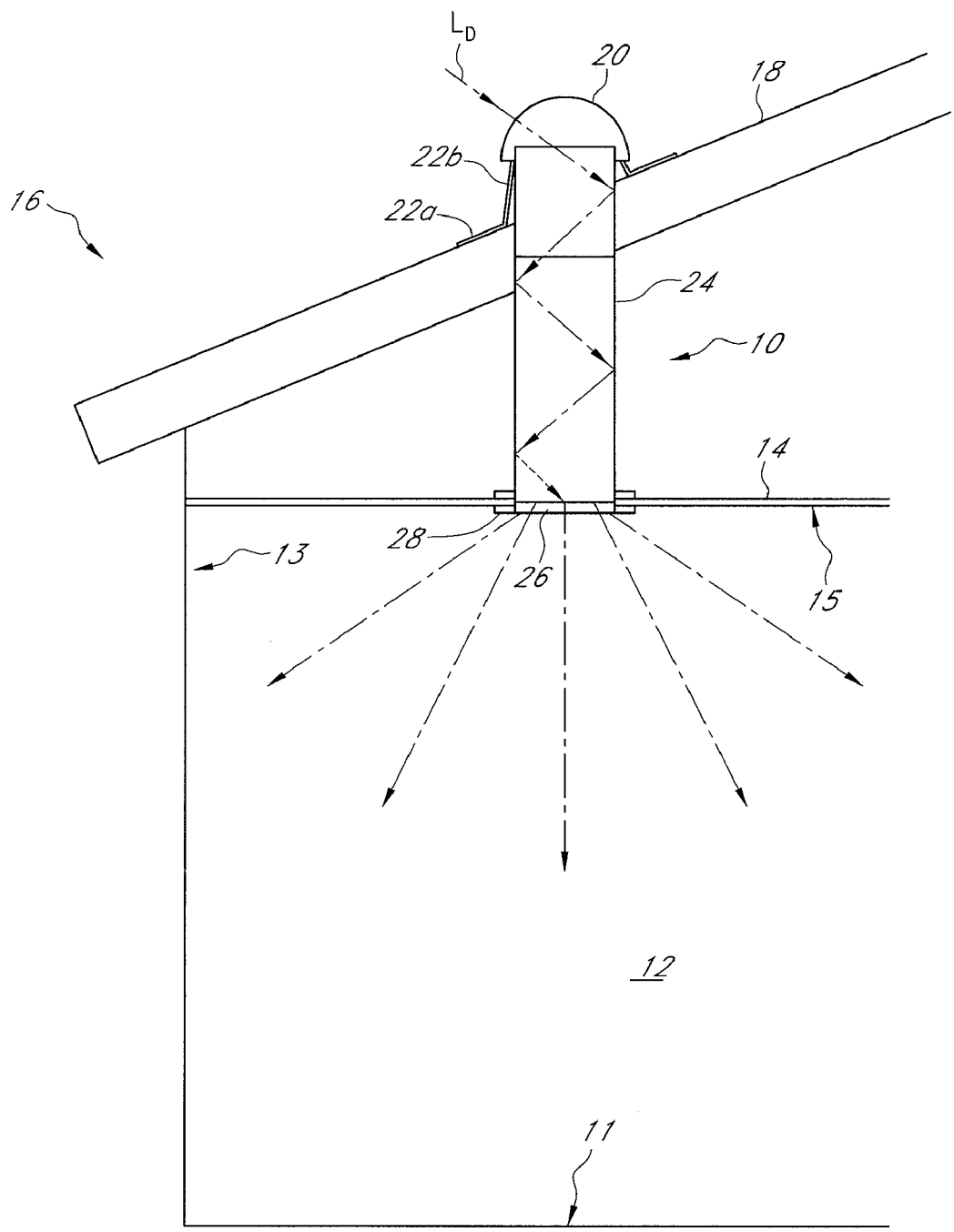
FIG. 1 schematically illustrates an example of a TDD installation.

Although certain preferred embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

In some embodiments, a TDD installation transports sunlight from the roof of a building to the interior via a tube with a reflective surface on the tube interior. A TDD installation can sometimes also be referred to as a "tubular skylight." A TDD installation can include a transparent cover installed on the roof of a building or in another suitable location. A tube with a reflective surface on the tube interior extends between the cover and a diffuser installed at the base of the tube. The transparent cover can be dome-shaped or can have another suitable shape and can be configured to capture sunlight. In certain embodiments, the cover keeps environmental moisture and other material from entering the tube. The diffuser spreads light from the tube into the room or area in which the diffuser is situated.

The cover can allow exterior light, such as daylight, to enter the system. In some embodiments, the cover includes a light collection system configured to enhance or increase the daylight entering the tube. In certain embodiments, a TDD installation includes a light mixing system. For example, the light mixing system can be positioned in the tube or integrated with the tube and can be configured to transfer light in the direction of the diffuser. The diffuser can be configured to distribute or disperse the light generally throughout a room or area inside the building. Various diffuser designs are possible. An auxiliary lighting system can be installed in a TDD to provide light from the tube to the targeted area when daylight is not available in sufficient quantity to provide a desired level of interior lighting.

The direction of light reflecting through the tube can be affected by various light propagation factors. Light propagation factors include the angle at which the light enters the TDD, which can sometimes be called the "entrance angle." The entrance angle can be affected by, among other things, the solar elevation, optics in the transparent cover, and the angle of the cover with respect to the ground. Other light propagation factors include the slope of one or more portions of a tube sidewall and the specularity of the sidewall's internal reflective surface. The large number of possible combinations of light propagation factors throughout a single day can result in light exiting the TDD at a wide and continuously varying range of angles.

FIG. 1 shows a cutaway view of an example of a TDD 10 installed in a building 16 for illuminating, with natural light, an interior room 12 of the building 16. The TDD 10 includes a transparent cover 20 mounted on a roof 18 of the building 16 that allows natural light to enter a tube 24. The cover 20 can be mounted to the roof 18 using a flashing. The flashing can include a flange 22a that is attached to the roof 18, and a curb 22b that rises upwardly from the flange 22a and is angled as appropriate for the cant of the roof 18 to engage and hold the cover 20 in a generally vertically upright orientation. Other orientations are also possible.

The tube 24 can be connected to the flashing 22 and can extend from the roof 18 through a ceiling 14 of the interior room 12. The tube 24 can direct light $L_D$ that enters the tube 24 downwardly to a light diffuser 26, which disperses the light in the room 12. The interior surface 25 of the tube 24 can be reflective. In some embodiments, the tube 24 has at least a section with substantially parallel sidewalls (e.g., a generally cylindrical surface). Many other tube shapes and configurations are possible. The tube 24 can be made of metal, fiber, plastic, a rigid material, an alloy, another appropriate material, or a combination of materials. For example, the body the tube 24 can be constructed from type 1150 alloy aluminum. The shape, position, configuration, and materials of the tube 24 can be selected to increase or maximize the portion of daylight $L_D$ or other types of light entering the tube 24 that propagates into the room 12.

The tube 24 can terminate at or be functionally coupled to a light diffuser 26. The light diffuser 26 can include one or more devices that spread out or scatter light in a suitable manner across a larger area than would result without the diffuser 26 or devices thereof. In some embodiments, the diffuser 26 permits most or substantially all visible light traveling down the tube 24 to propagate into the room 12. The diffuser can include one or more lenses, ground glass, holographic diffusers, other diffusive materials, or a combination of materials. The diffuser 26 can be connected to the tube 24 using any suitable connection technique. For example, a seal ring 28 can be surroundingly engaged with the tube 24 and connected to the light diffuser 26 in order to hold the diffuser 26 onto the end of the tube 24. In some embodiments, the diffuser 26 is located in the same general plane as the ceiling 14, generally parallel to the plane of the ceiling, or near the plane of the ceiling 14.

In certain embodiments, the diameter of the diffuser 26 is substantially equal to the diameter of the tube 24, slightly greater than the diameter of the tube 24, slightly less than the diameter of the tube 24, or substantially greater than the diameter of the tube 24. The diffuser 26 can distribute light incident on the diffuser toward a lower surface (e.g., the floor 11) below the diffuser and, in some room configurations, toward an upper surface (e.g., at least one wall 13 or ceiling surface 15) of the room 12. The diffuser 26 can spread the light such that, for example, light from a diffuser area of at least about 1 square foot and/or less than or equal to about 4 square feet can be distributed over a floor and/or wall area of at least about 60 square feet and/or less than or equal to about 200 square feet in a typical room configuration.

Diffusers that employ principally direct diffusion, such as downward directing diffusers, distribute light in certain ways that can be undesirable. Some direct diffusers distribute light such that the intensity of light on the floor 11 when measured on a horizontal plane is highest directly under the diffuser 26 and decreases with distance away from the location directly under the diffuser 26. In some instances, the distribution of light on the floor is characterized by a cosine effect. For example, the intensity of the light can be directly related to the cosine of the incident angle of the light to the floor and inversely related to the distance between the diffuser 26 and the floor. Accordingly, non-uniform floor light levels are typically observed when certain types of diffusers are used in a TDD 10. Further, certain types of direct diffusers are characterized by intense light exiting the diffuser 26 from ceiling levels less than 15 feet at angles of 45 to 60 degrees (measured from vertical). Intense light at those angles can create visibility problems in an area, including glare and computer screen washout. The contrast of the bright diffuser area and the dark non-illuminated ceiling can also increase the perceived glare and reduce the view of the ceiling area. These are some common undesirable characteristics related to downward directing diffusers.

Diffusers that employ principally indirect diffusion typically distribute light principally to the ceiling and/or walls of an area. Indirect diffusers can also distribute light in ways that are undesirable. For example, indirect diffusers typically distribute a smaller portion of light to the floor 11 or working areas than direct diffusers. Thus, there may be a substantially dark or dimly-lit area on the floor 11 directly under the TDD 10.

In some embodiments, a diffuser 26 provides substantial amounts of both direct diffusion and indirect diffusion. In certain embodiments, a diffuser 26 redirects a portion of the light $L_D$ that exits the tube 26 at the ceiling level onto a surrounding supper region (e.g., a ceiling surface 15) and distributes the remainder to a lower region (e.g., the floor 11 and walls 13). Such a diffuser 26 can illuminate the floor 11 more uniformly. Light $L_D$ that is projected onto the painted ceiling surface 15 and walls 13 will reflect off of these surfaces 13, 15 in a diffuse, widespread pattern that will mix the light considerably before reaching the floor level 11. Allowing a portion or fraction of the light $L_D$ to pass directly to the floor 11 through a diffuser 26 or light spreading device can mitigate or eliminate the occurrence of a dark area under the TDD 10.

In some embodiments, a diffuser 26 reduces the light intensity in a region greater than or equal to about 45° and/or less than or equal to about 60° azimuthally away from the axis of the tube 24 by distributing more light $L_D$ upward to the ceiling surface 15, thereby eliminating or reducing the incidence of glare and display washout. Further, light that passes through the hollow interior of the diffuser 26 can be directed or controlled such that it has an exit angle of less than about 45° from vertical. When at least the areas of the ceiling surface 15 near the TDD 10 or other areas generally in the upper portion of the room 12 are illuminated, the contrast ratio between the diffuser 26 and the surrounding ceiling surface 15 can be reduced, and a brighter overall room appearance can be created.

In the embodiments illustrated in FIGS. 2A-2B, an optical element 110 is suspended below the level of the ceiling 14 in order to direct light onto the ceiling surface 15. The distance z that the optical element 110 extends below the ceiling 14 can be selected such that the optical element 110 directs adequate light towards the ceiling surface 15 while not substantially intruding into the available space of the room 12. Factors that may affect the selection of the distance z can include ceiling height, other room dimensions, aesthetics, other functional or architectural factors, or a combination of factors. For example, a shorter distance z may be selected when the TDD 10 is installed in a room 12 with low ceiling height. In some embodiments, the distance z is less than the height of the diffuser 26.

Figure 2A:
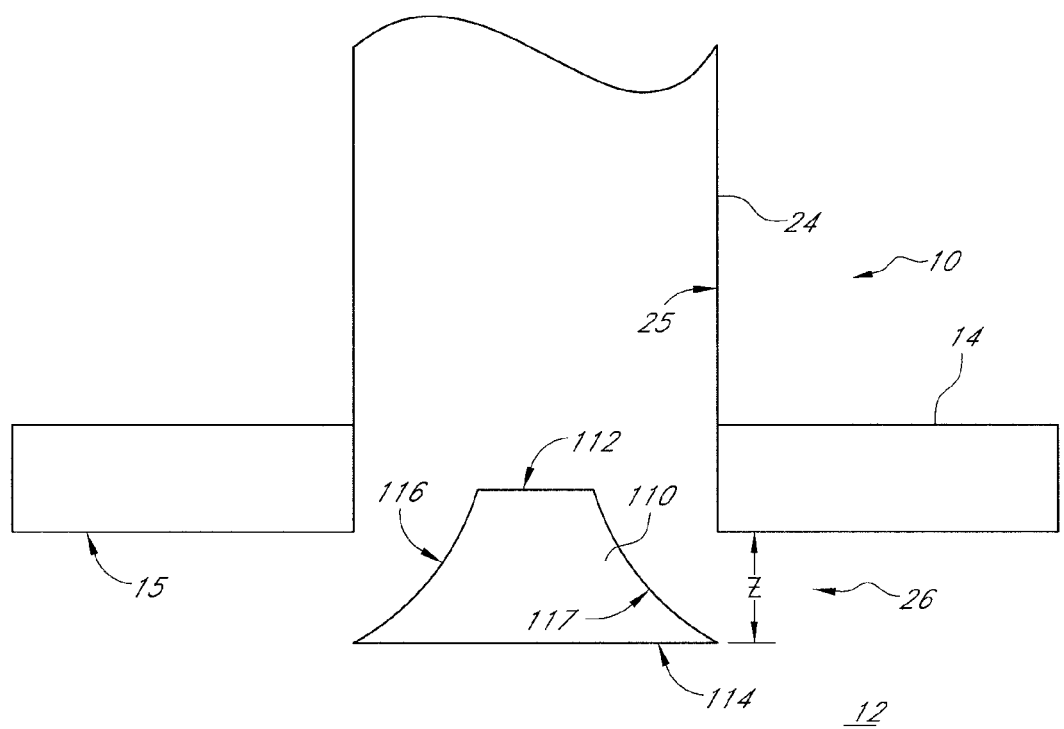
FIG. 2A is a cross-sectional detail view of an example TDD installation with an optical element having a generally continuously-curved reflective surface.

As shown in FIG. 2A, the diffuser 26 can include a curved optical element 110 placed directly below and partially inside the base of the tube 24. In the example embodiment illustrated in FIG. 2A, the shape of the optical element 110 can generally conform to a right circular, outwardly concave frusto-hyperbolic section. Many other variations in the shape of the optical element 110 are possible. In some embodiments, the optical element 110 is shaped to reflect light incident over the area of the element 110 at a plurality of incident angles such that light turned by the optical element 110 is dispersed over a relatively large angular range (for example, at least about 180° or at least about 200°). In certain embodiments, the light incident on the optical element 110 is substantially collimated while the light exiting the optical element 110 is substantially distributed throughout the room 12 in which the TDD 10 is installed. In some embodiments, the distribution of light exiting the optical element 110 includes a substantial portion of light dispersed across each of the upper and lower regions (e.g., the ceiling surface 15, walls 13, and floor 11) of the room 12.

The optical element 110 can be constructed from a material system including, for example, metal, plastic, paper, glass, ceramic, a coating, a film, another suitable material, or a combination of materials. In some embodiments, the optical element 110 includes an aluminum substrate with a reflective coating on each face. The optical element 110 illustrated in FIG. 2A has a reflective, concave outer face 116 that extends circumferentially about an axis. The outer face 116 faces away from the axis, while a reflective, convex inner face 117 opposite the outer face 116 faces towards the axis, toward the hollow interior of the optical element 110. In certain embodiments, the central axis of the optical element 110 is substantially collinear with a central axis of the tube 24.

The surfaces of the outer face 116 and the inner face 117 can be made reflective by any suitable technique, including, for example, electroplating, anodizing, coating, or covering the surfaces 116, 117 with a reflective film. Reflective films can be highly reflective in at least the visible spectrum and include metallic films, metalized plastic films, multi-layer reflective films, or any other structure that substantially reflects light in the visible spectrum. The material from which the optical element 110 is constructed may also be inherently reflective. In some embodiments, at least a portion of the surfaces of the outer face 116 and the inner face 117 are generally specular.

A top plane 112 of the optical element 110 is generally open so that light traveling down the tube 24 can pass into the hollow interior of the element 110. A bottom plane 114 of the element 110 is also generally open such that light propagating through the interior of the element 110 can exit the element 110 and enter the room 12 below in the general direction of the floor 11. The aperture of the top plane 112 and the aperture of the bottom plane 114 can be substantially circular or any other suitable shape. In some embodiments, one or more of the apertures are the same shape as the shape of a cross-section of the tube 24. In certain embodiments, the diameter of the bottom plane 114 aperture is substantially equal to the diameter of the tube 24, slightly greater than the diameter of the tube 24, slightly less than the diameter of the tube 24, or substantially greater than the diameter of the tube 24. The diameter of the top plane 112 aperture can be smaller than the diameter of the bottom plane 114 aperture, less than or equal to about half the diameter of the bottom plane 114 aperture, less than or equal to about 75% of the diameter of the bottom plane 114 aperture, or another suitable diameter. In some embodiments, the diameter of the top plane 112 aperture is selected to achieve a desired ratio of direct diffusion to indirect diffusion. For example, if a higher ratio of direct diffusion to indirect diffusion is desired, then the diameter of the aperture of the top plane 112 can be increased.

In some embodiments, the typical incident angle of substantially collimated light propagating down the tube 24 and incident on the optical element 110 depends on whether the light is incident on one of the reflective faces 116, 117 at a position near the top plane 112 or whether the light is incident at a position near the bottom plane 114 of the optical element 110. In the example illustrated embodiment, the shape of the faces 116, 117 permits the angle of incidence for collimated incoming light to be larger at positions closer to the top plane 112 and comparatively smaller at positions closer to the bottom plane 112 of the optical element 110. While FIG. 2A shows an optical element 110 with reflective faces 116, 117 having a particular curvature, it is understood that faces 116, 117 having other curvature or shapes can be used. For example, in some embodiments, the vertical cross-section of the faces 116, 117 (for example, the cross-section shown in FIG. 2A) can have a generally elliptical shape, a generally hyperbolic shape, a generally parabolic shape, a generally negative intrinsic curvature, a generally positive intrinsic curvature, another geometry, or a combination of differently-shaped regions. The shape of the faces 116, 117 can be selected such that a substantial amount of light is directed towards the floor 11, wall 13, and ceiling surfaces 15 of the room 12 when the optical element 110 is positioned below the tube 24 in a TDD 10 installation.

Figure 2B:
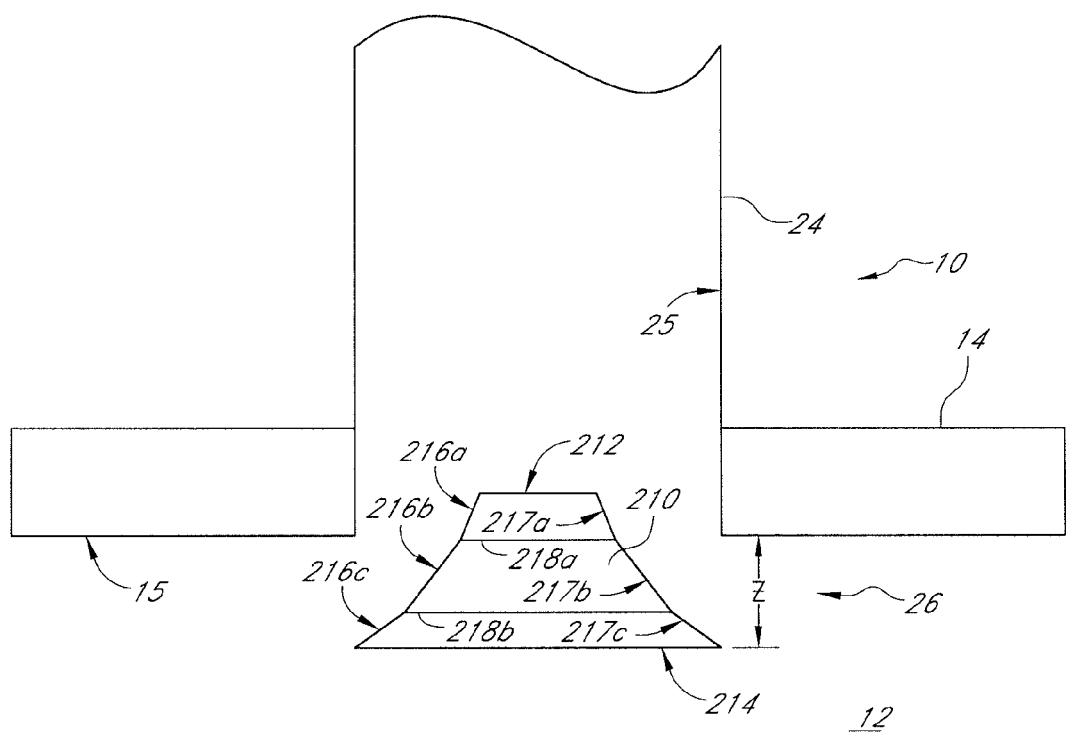
FIG. 2B is a cross-sectional detail view of an example TDD installation with an optical element having a reflective surface with multiple faces in a segmented shape.

The example diffuser 26 illustrated in FIG. 2B includes an optical element 210 having a shape generally conforming to a plurality (e.g., three) contiguous right circular frustoconical sections. Many other variations in the shape of the optical element 210 are possible. The illustrated optical element 210 has a hollow interior and can be placed below and partially inside the tube 24. In some embodiments, the optical element 210 has a plurality of faces 216a-c, 217a-c oriented at various angles to reflect light incident over the area of the element 210 at a plurality of incident angles such that light turned by the optical element 210 is dispersed over a relatively large angular range (for example, at least about 180° or at least about 200°). In certain embodiments, the light incident on the optical element 210 is substantially collimated while the light exiting the optical element 210 is substantially distributed throughout the room 12 in which the TDD 10 is installed. In some embodiments, the distribution of light exiting the optical element 210 includes a substantial portion of light dispersed across each of the upper and lower regions (e.g., the ceiling surface 15, walls 13, and floor 11) of the room 12.

The optical element 210 can be constructed from a variety of materials, including the materials discussed with respect to the optical element 110 described previously. The optical element 210 illustrated in FIG. 2B has a plurality of reflective outer faces 216a-c that extend generally circumferentially about an axis. The outer faces 216a-c face away from the axis, while a plurality of reflective inner faces 217a-c generally opposite the outer faces 216a-c face toward the hollow interior of the optical element 210. In certain embodiments, the central axis of the optical element 210 is substantially collinear with a central axis of the tube 24.

A top plane 212 of the optical element 210 is generally open so that light traveling down the tube 24 can pass into the hollow interior of the element 210. A bottom plane 214 of the element 210 is also open such that light propagating through the interior of the element 210 can exit the element 210 and enter the room 12 below in the general direction of the floor 11. The shapes and sizes of the top plane 212 aperture and the bottom plane 214 aperture can be selected in at least the same ways as the shapes and sizes of the apertures of the optical element 110 described previously.

In some embodiments, the incident angle of substantially collimated light propagating down the tube 24 and incident on the optical element 210 is different when the light is incident on a surface near the top plane 212 than when the light is incident on a surface near the bottom plane 214 of the optical element 210. In the example illustrated embodiment, the arrangement of the plurality of faces 216a-c, 217a-c permits the angle of incidence for collimated incoming light to be larger at the faces 216a, 217a closer to the top plane 212 ("top faces") of the optical element 210 and comparatively smaller at the faces 216c, 217c closer to the bottom plane 212 ("bottom faces") of the optical element 210. The arrangement of the faces 216b, 217b between the top faces 216a, 217a and the bottom faces 216c, 217c ("middle faces") can permit the incident angle of the collimated light at the middle faces 216b, 217b to be between the incident angle at the top faces 216a, 217a and the incident angle at the bottom faces 216c, 217c in magnitude. While the illustrated embodiment has three regions of reflective faces, it is understood that any number of reflective face regions can be employed, including, for example, one region, two regions, four regions, more than four regions, two or more regions, between two and four regions, and so forth.

The number and configuration of exterior faces 116a-c and interior faces 117a-c can be selected such that a substantial amount of light is directed towards the floor 11, wall 13, and ceiling surfaces 15 of the room 12 when the optical element 210 is positioned below the tube 24 in a TDD 10 installation, or such that light is distributed generally uniformly around both upper and lower regions of a room at the same time. For example, in some embodiments light can be distributed by the diffuser 26 generally continuously across a region extending from a plane generally parallel with the base 214 of the optical element 210 to a plane generally perpendicular to the to the diffuser 26 and generally parallel to the axis of the tube 24. In certain embodiments, light can be distributed by the diffuser 26 generally continuously through an angle sweeping from an upper region of the room 12 generally adjacent to or near the TDD 10 to a lower region of the room 12 generally below the TDD 10. For example, the diffuser 26 can direct portions of incoming daylight upwards, to the left, to the right, and/or downwards.

The optical element 210 can include transition regions 218a-b disposed between reflective faces having differing geometry. For example, a first transition region 218a can be disposed between the top faces 216a, 217a and the middle faces 216b, 217b, and a second transition region 218b can be disposed between the middle faces 216b, 217b and the bottom faces 216c, 217c. In some embodiments, the number of transition regions 218a-b is equal to one less than the number of reflective face regions having differing geometry. For example, the example embodiment illustrated in FIG. 2B has three frustoconical face regions having different slant angles and two transition regions 218a-b. The transition regions 218a-b can include creases, rounded corners, or other transitional elements between reflective face regions. In some embodiments, the transition regions 218a-b form a sharp transition between reflective face regions. Alternatively, the transition regions 218a-b can form a more gradual transition between reflective face regions.

The optical element 210 can control and distribute light exiting the tube 24 according to various optical element design properties and their associated principles. In the example embodiment illustrated in FIG. 3, the reflective surfaces 216a-c, 217a-c of the optical element 210 are designed to accommodate a specific range of angles of light to maintain a constant, a nearly constant, or a substantially evened illumination on the ceiling surfaces 15 and walls (not shown) of the room 12. Light reflects down the tube 24 at the same elevation angle from horizontal at which the light entered the tube 24. Therefore, for most inhabited locations on the planet, in many embodiments, the elevation angle from horizontal of light entering the tube 24 will range from about 20 to 70 degrees. The elevation angle depends on the sun angle, which varies throughout the course of a day and also throughout the course of a year.

Figure 3:
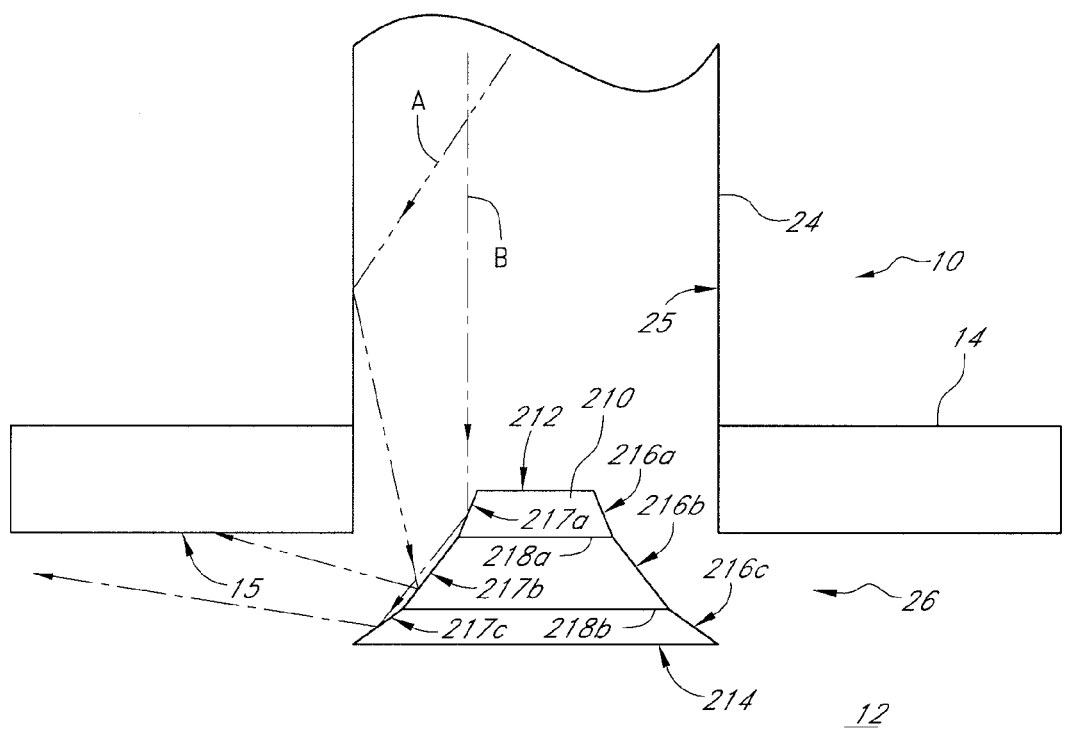
FIG. 3 is a ray diagram illustrating a propagation of light through the example TDD installation illustrated in FIG. 2B.

The propagation of light through the tube 24 and the interaction of light with the optical element 210 vary with the elevation angle of the light. For example, in some embodiments, light A entering at lower sun angles will reflect once off a sloped surface 216b of the optical element 210, as shown in FIG. 3. In certain such embodiments, light B entering the tube 24 at higher sun angles will reflect multiple times off surfaces 216a, 216c of the optical element 210. Accordingly, both the low-angle light A and the high-angle light B are directed towards the ceiling surface 15 at exit angles that are considerably closer than the elevation angles of the light when it entered the tube 24. By reflecting light differently depending on the elevation angle of the light, the optical element 210 can provide similar exit angles and illumination on the ceiling surface 15 and walls of the room 12 for high elevation angle light and low elevation angle light.

Figure 4:
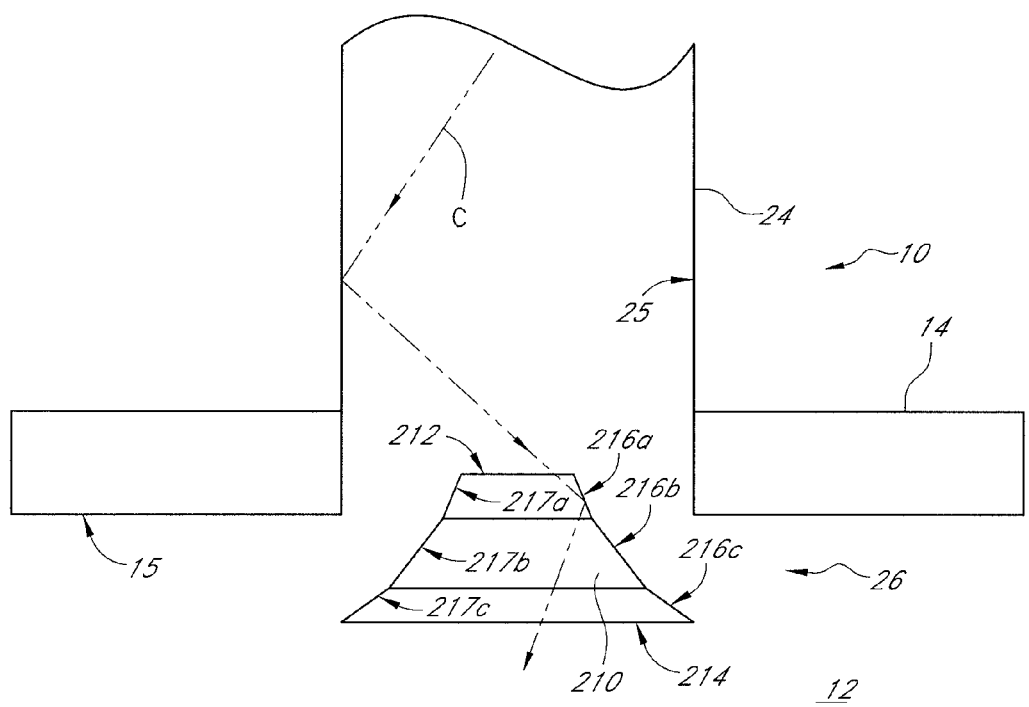
FIG. 4 is another ray diagram illustrating a propagation of light through the example TDD installation illustrated in FIG. 2B.

The top plane 212 of the optical element 210 can be open, substantially open, or at least partially open to allow light C to transmit down to the area below the tube 24 (for example, towards the floor of the room 12). In the example embodiment illustrated in FIG. 4, light C passes through the top plane 212 and reflects off an interior face 217a of the optical element 210. The interior face 217a turns the light C such that the exit angle of the light C from the TDD 10 is closer to vertical than the entrance angle of the light C. In some embodiments, the optical element 210 increases the elevation angle from horizontal of at least a portion of the light propagating through the interior of the optical element 210 such that the at least a portion of the light exits the TDD 10 at a more vertical angle, as illustrated. The degree to which the light C is turned can depend on the orientation and position of the portion of the interior face 217 on which the light C is incident.

In certain embodiments, the optical element 210 is designed to ensure that light passing through the optical element 210 will exit the bottom plane 214 of the optical element 210 at an exit angle of less than about 45 degrees from vertical or at a nearly vertical orientation in order to reduce or prevent the light C from exiting the TDD 10 at a 45 to 60 degree angle from vertical. In this manner, the optical element 210 can reduce or eliminate the glare and visibility issues that light exiting a fixture at those angles can cause.

Figure 5:
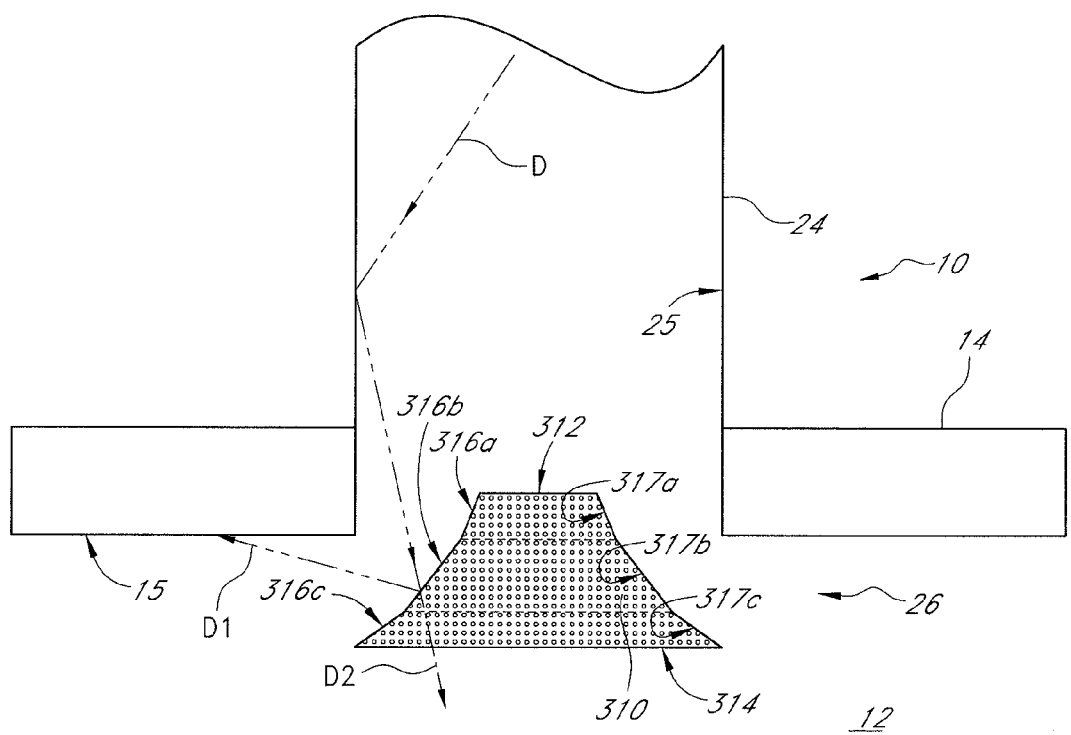
FIG. 5 is a ray diagram illustrating a propagation of light through an example TDD installation with a perforated optical element.
Figure 8:
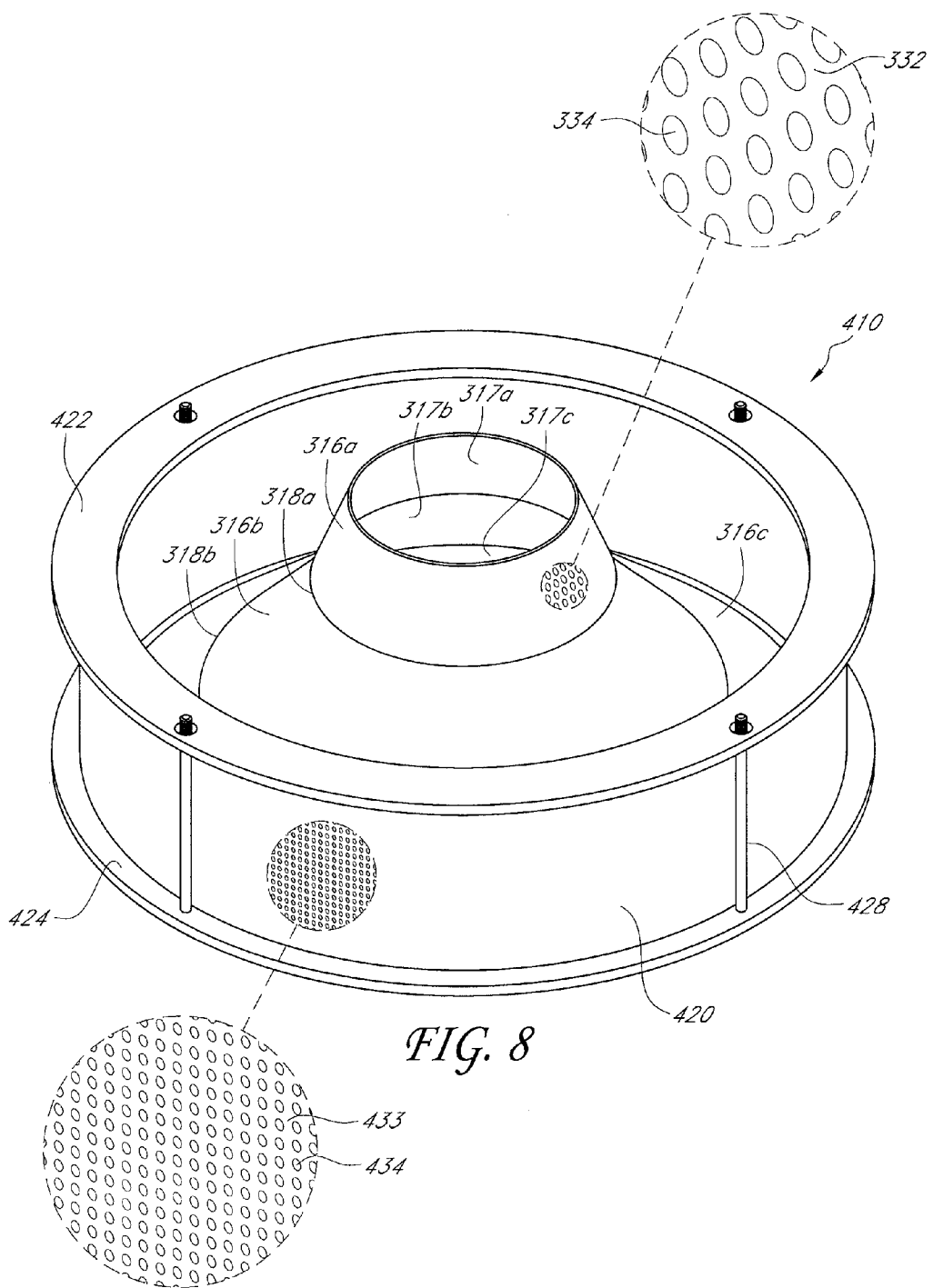
FIG. 8 is a perspective view of an example diffuser and an example additional optical element.

In the example embodiment illustrated in FIGS. 5 and 8, an optical element 310 is shown that can resemble the optical elements 110, 210 described previously in many ways, but differs in manners such as those discussed hereafter. The optical element 310 has exterior faces 316a-c and interior faces 317a-c that are at least partially reflective and at least partially transmissive. In some embodiments, the optical element 310 is constructed from a material 332 that is perforated, cut, molded, or otherwise constructed such that the material is interrupted by a plurality of openings 334 that extend through the material. The openings 334 can be sized and positioned in order to allow a substantial amount of light D2 to transmit downward and a substantial amount of light D1 to be reflected towards the ceiling surfaces 15 or walls of the room 12. Incident light D is turned when it is incident on the reflective material 332 but transmits through the openings 334. In some embodiments, the openings 334 are generally evenly distributed over the surface of the optical element 310. Alternatively, the openings 334 can be distributed according to a pattern that is configured to produce any desired effect.

In some embodiments, the openings 334, 434 are not true physical openings, but merely optical openings formed of translucent or transparent material surrounded by or adjacent to opaque or reflective material. Other structures or configurations can also be used to permit a portion of the light to be directed generally perpendicularly to the diffuser 26 and a portion of the light to be directed generally in the direction of the periphery of the diffuser 26.

In certain embodiments, the openings 334 are configured such that the total area encompassed by the openings is about 50% of the surface area of the optical element 310. Alternatively, the openings can be configured such that the openings 334 cover less than or equal to about 60% of the surface, more than or equal to about 40% of the surface, or another portion that can be selected to give the optical element 310 any desired optical characteristics. By adjusting the size and arrangements of openings 334 in the optical element 310, a TDD manufacturer can tailor the reflection and transmission characteristics of the optical element 310 to account for the relative amount of illumination needed on the ceiling surface 15, walls, and/or floor of the room 12. In certain embodiments, the illumination on the ceiling surface 15, walls, and/or floor of the room 12 emanating from a TDD installation can be adjusted without increasing or decreasing the size of the tube.

Figure 6:
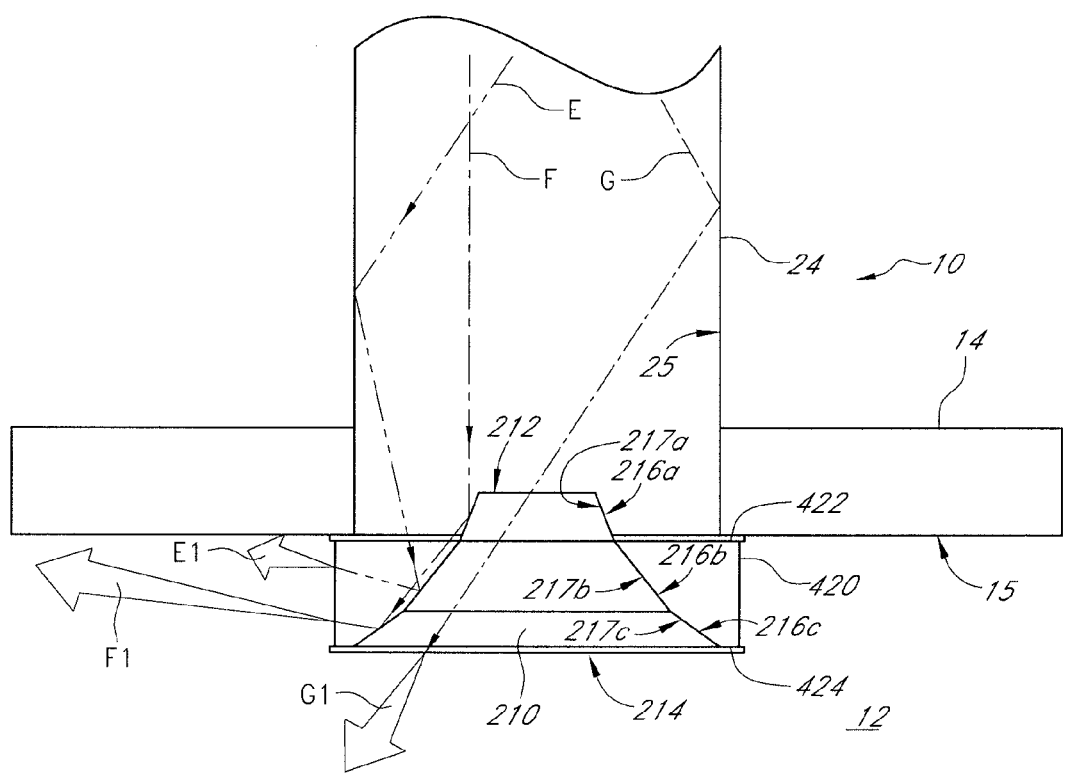
FIG. 6 is a ray diagram illustrating a propagation of light through an example TDD installation with a first optical element and a second optical element.
Figure 9:
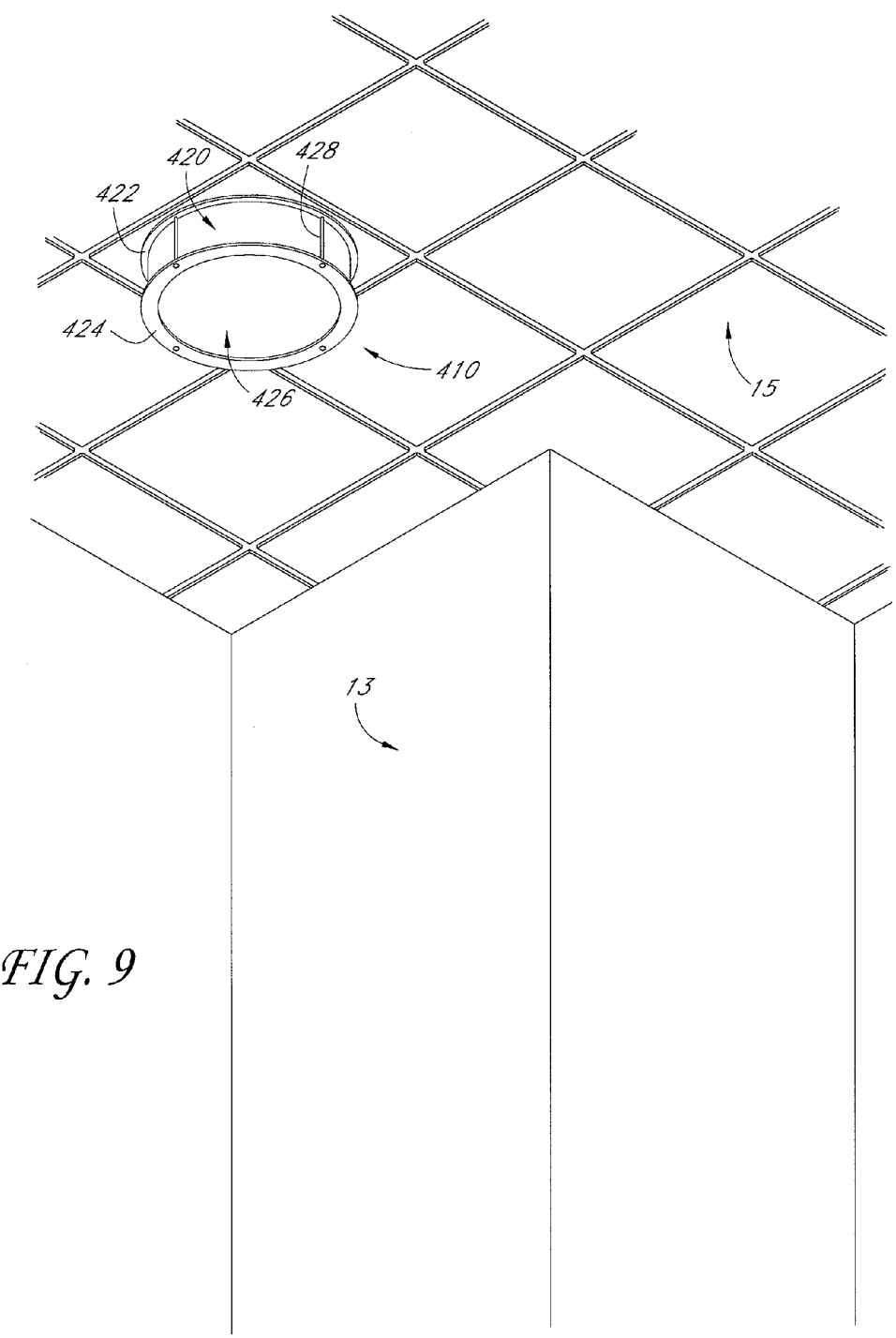
FIG. 9 is a perspective view of an example TDD installation with a diffuser and an additional optical element.

One or more optical elements in addition to the optical elements 210, 310 described above can be used to further control the distribution of light as it exits the TDD 10. In the example embodiment illustrated in FIGS. 6, 8 and 9, a second optical element 410 is disposed between the optical element 210 and the room 12. The second optical element 410 is a light diffusing structure configured to interact with light E, F reflected by and/or light G passing through the optical element 210. In the embodiment illustrated in FIG. 6, light E propagating along a first path reflects off the interior surface 25 of the tube 24 and is incident on the optical element 210 at a middle exterior face 216b. The middle exterior face 216b reflects and turns the light E toward the ceiling surface 15. The light E propagates to the second optical element 410, which spreads the light. Light E1 exiting the second optical element 410 is spread in a diffused pattern generally toward the ceiling surfaces 15 and walls 13 of the room 12. Light F propagating along a second path is incident on the optical element at an upper exterior face 216a. The upper exterior face 216a reflects and turns the light F toward a lower exterior face 216c of the optical element 210. The lower exterior face 216c reflects and turns the light F generally toward the ceiling surface 15. The light F propagates to the second optical element 410, which spreads the light. Light F1 exiting the second optical element 410 is spread in a diffused pattern generally toward the ceiling surfaces 15 and walls 13 of the room 12. Light G propagating along a third path reflects off the interior surface 25 of the tube 24 and passes through the optical element 210. The light G propagates to the second optical element 410, which spreads the light. Light G1 exiting the second optical element 410 is spread in a diffused pattern generally toward the floor 11 of the room 12.

Many variations in the shape, position, and construction of the second optical element 410 are possible. The second optical element 410 can include a first diffusing surface 420 extending from the ceiling 14 to the base of the optical element 210. A second diffusing surface 426 can refract light exiting the base 214 of the optical element 210. The diffusing surfaces 420, 426 can be made from any suitable material such as, for example, transparent plastic, translucent plastic, glass, one or more lenses, ground glass, holographic diffusers, another diffusing material, or a combination of materials.

In some embodiments, at least one of the diffusing surfaces 420, 426 comprises a substantially continuous diffusing material 432, a diffusing material 432 interspersed with openings 434, another material, or a combination of materials. The second optical element 410 can reduce the contrast between the TDD 10 and the ceiling surfaces 15 and/or walls 13 surrounding the TDD 10 by further diffusing light E1, F1, G1 exiting the TDD 10. In certain embodiments, the first optical element 210 turns at least a portion of incident light E, F using a shaped reflective surface while the second optical element 410 spreads incident light E, F, G using refraction or photon diffusion. In some embodiments, the diffusing surfaces 420, 426 are held in place or supported by supporting structures. The supporting structures can be constructed from any suitable material and can include rings 424, 426, rods 428, other structural elements, or a combination of elements.

Figure 7:
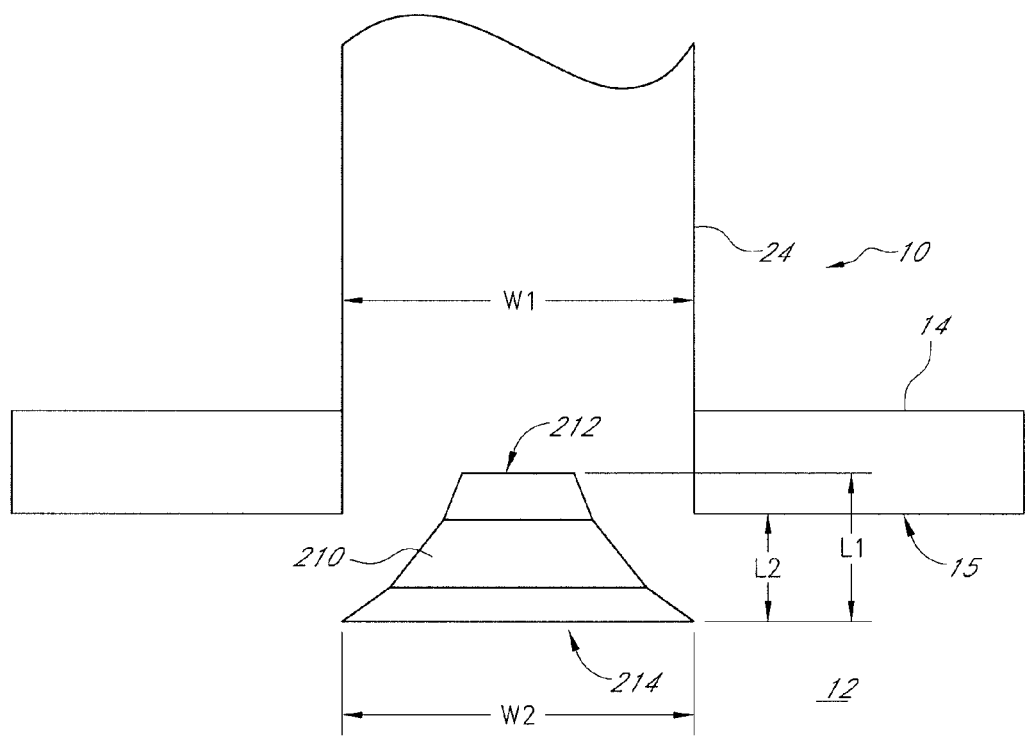
FIG. 7 is a cross-sectional view showing certain dimensions and proportions of an example TDD installation with a diffuser.

Example dimensions and proportions of the TDD will now be discussed with reference to the embodiment shown in FIG. 7. In some embodiments, the design of the TDD 10 is compact. For example, the width or diameter W2 (width dimension) of the base 214 of the optical element 210 may be approximately equal to the width dimension W1 of the tube 24. In some embodiments, the width dimension W2 of the base 214 is less than or equal to the sum of the width dimension W1 of the tube 24 and a relative short distance (e.g., about one inch). In an example embodiment, the diameter W2 of the base 214 is 21.25" when the diameter W1 of the tube 24 is 21". Other suitable tube 24 and optical element 210 dimensions can be selected as appropriate to provide desired lighting and diffusion characteristics to the room 12.

In certain embodiments, the optical element 210 extends a short distance L2 from the ceiling 14 into the room 12. For example, the distance L2 between the ceiling 14 and the base 214 of the optical element 210 can be at least about six inches and/or less than or equal to about twelve inches, less than or equal to about twelve inches, or less than or equal to about nine inches. In some embodiments, the optical element 210 extends at least partially into the tube 24. For example, if the height L1 of the optical element 210 is 8.85" and the distance L2 between the base 214 of the optical element 210 and the ceiling 14 is 6.5", then the optical element 210 will extend 2.35" into the tube. By positioning the optical element 210 at least partially into the tube 24, the distance between the base 214 of the optical element 210 and the ceiling 14 can be decreased.

At least some of the embodiments disclosed herein may provide one or more advantages over existing daylighting systems. For example, certain embodiments effectively allow a TDD to distribute light exiting the TDD onto the upper and lower regions of a room (e.g., the ceiling, walls, and/or floor). As another example, some embodiments provide techniques for allowing substantially light transmission directly beneath a TDD and to the sides of the TDD. As another example, certain embodiments provide an indirect diffuser that also allows a portion of incident light to transmit directly through the diffuser. As another example, some embodiments provide an indirect diffuser that provides substantial illumination directly below the diffuser and has reduced contrast between the base of the diffuser and an illuminated ceiling.

Discussion of the various embodiments disclosed herein has generally followed the embodiments illustrated in the figures. However, it is contemplated that the particular features, structures, or characteristics of any embodiments discussed herein may be combined in any suitable manner in one or more separate embodiments not expressly illustrated or described. For example, it is understood that a diffuser can include multiple optical elements, reflective surfaces, and/or diffusing surfaces. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the diffusers disclosed herein may be used in at least some daylighting systems and/or other lighting installations besides TDDs.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

What is claimed is:

1. A daylighting apparatus comprising:
an internally reflective tube configured to direct daylight from a first end of the tube and a second end of the tube opposite the first end; and
a diffuser positioned at the second end of the tube, the diffuser comprising a first optical structure configured such that, when the day lighting apparatus is installed with the first end positioned outside a room and the second end positioned to provide light to the room:
   a reflected portion of the daylight is directed towards at least one ceiling or upper wall surface of the room; and
   a transmitted portion of the daylight is directed towards at least one floor or lower surface of the room;
wherein the first optical structure comprises at least one reflective surface interrupted by a plurality of openings configured to permit at least some of the transmitted portion of the daylight to pass through the first optical structure.

2. The daylighting apparatus of claim 1, wherein the first optical structure comprises a reflective surface shaped and positioned to turn the reflected portion of the daylight.

3. The daylighting apparatus of claim 2, wherein the reflective surface comprises at least a first face configured to reflect collimated daylight at a first incident angle.

4. The daylighting apparatus of claim 3, wherein the reflective surface comprises at least a second face configured to reflect the collimated daylight at a second incident angle different from the first incident angle.

5. The daylighting apparatus of claim 2, wherein the reflective surface comprises at least a first curved face configured to reflect collimated daylight at a plurality of incident angles.

6. The daylighting apparatus of claim 2, wherein the reflective surface comprises a lower reflective face region, a middle reflective face region, and an upper reflective face region.

7. A daylighting apparatus comprising:
an internally reflective tube configured to direct daylight from a first end of the tube and a second end of the tube opposite the first end; and
a diffuser positioned at the second end of the tube, the diffuser comprising a first optical structure configured such that, when the daylighting apparatus is installed with the first end positioned outside a room and the second end positioned to provide light to the room:
   a reflected portion of the daylight is directed towards at least one ceiling or upper wall surface of the room; and
   a transmitted portion of the daylight is directed towards at least one floor or lower surface of the room;
wherein the first optical structure comprises a reflective surface shaped and positioned to turn the reflected portion of the daylight;
wherein the reflective surface comprises a lower reflective face region, a middle reflective face region, and an upper reflective face region; and
wherein each of the lower reflective face region, the middle reflective face region, and the upper reflective face region comprises a conical frustum.

8. A daylighting apparatus comprising:
an internally reflective tube configured to direct daylight from a first end of the tube and a second end of the tube opposite the first end; and
a diffuser positioned at the second end of the tube, the diffuser comprising a first optical structure configured such that, when the daylighting apparatus is installed with the first end positioned outside a room and the second end positioned to provide light to the room:
   a reflected portion of the daylight is directed towards at least one ceiling or upper wall surface of the room; and
   a transmitted portion of the daylight is directed towards at least one floor or lower surface of the room;
wherein the first optical structure comprises at least one aperture shaped and positioned to permit at least some of the transmitted portion of the daylight to pass through the first optical structure.

9. A daylighting apparatus comprising:
an internally reflective tube configured to direct daylight from a first end of the tube and a second end of the tube opposite the first end; and
a diffuser positioned at the second end of the tube, the diffuser comprising a first optical structure configured such that, when the daylighting apparatus is installed with the first end positioned outside a room and the second end positioned to provide light to the room:
   a reflected portion of the daylight is directed towards at least one ceiling or upper wall surface of the room; and
   a transmitted portion of the daylight is directed towards at least one floor or lower surface of the room;
wherein the diffuser comprises a second optical structure configured to receive light exiting the first optical structure.

10. The daylighting apparatus of claim 9, wherein the second optical structure is configured to spread the reflected portion of the daylight.

11. The daylighting apparatus of claim 10, wherein the second optical structure is configured to spread the transmitted portion of the daylight.

12. A daylighting apparatus comprising:
an internally reflective tube configured to direct daylight from a first end of the tube and a second end of the tube opposite the first end; and
a diffuser positioned at the second end of the tube, the diffuser comprising a first optical structure configured such that, when the daylighting apparatus is installed with the first end positioned outside a room and the second end positioned to provide light to the room:
   a reflected portion of the daylight is directed towards at least one ceiling or upper wall surface of the room; and
   a transmitted portion of the daylight is directed towards at least one floor or lower surface of the room;
wherein the first optical structure comprises a reflective element generally in the shape of a frustum of a hyperboloid.

* * * * *